(12) United States Patent
Wong et al.

(10) Patent No.: US 8,862,285 B2
(45) Date of Patent: Oct. 14, 2014

(54) AERIAL DISPLAY SYSTEM WITH FLOATING PIXELS

(71) Applicant: Disney Enterprises, Inc., Burbank, CA (US)

(72) Inventors: Clifford Wong, Burbank, CA (US); James Alexander Stark, South Pasadena, CA (US); Robert Scott Trowbridge, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 79 days.

(21) Appl. No.: 13/769,007

(22) Filed: Feb. 15, 2013

(65) Prior Publication Data

US 2014/0236388 A1 Aug. 21, 2014

(51) Int. Cl.
*G03B 21/00* (2006.01)
*G06F 19/00* (2011.01)

(52) U.S. Cl.
USPC .................... 701/2; 701/4; 701/23; 353/122

(58) Field of Classification Search
USPC ............. 701/2, 23, 24, 4; 353/7, 122; 348/51; 244/13, 155 R
See application file for complete search history.

(56) References Cited

U.S. PATENT DOCUMENTS

| 6,749,154 B1* | 6/2004 | Johnson .......................... 244/30 |
| 8,287,127 B2* | 10/2012 | Gao et al. .......................... 353/7 |
| 2002/0171927 A1* | 11/2002 | Barnes, III .................... 359/451 |
| 2005/0219479 A1* | 10/2005 | Mugrauer ..................... 353/122 |
| 2008/0313937 A1* | 12/2008 | Boyce ............................. 40/212 |

* cited by examiner

*Primary Examiner* — Tan Q Nguyen
(74) *Attorney, Agent, or Firm* — Marsh Fischmann & Breyfogle LLP; Kent A. Lembke

(57) ABSTRACT

A system for performing an aerial display. The system includes a plurality of UAVs each including a propulsion device and a display payload, and the system includes a ground station system with a processor executing a fleet manager module and memory storing a different flight plan and a set of display controls for the UAVs. Then, wherein, during a display time period, the UAVs concurrently execute the flight plans through operation of the propulsion devices and operate the display payloads based on the display controls. The display payloads each include a lighting assembly and a light controller. The output light is one of a two or more colored light streams, and each of the display payloads further may include a light diffuser with the output light being directed onto a surface of the light diffuser. The light diffuser may include a light diffusing screen extending about the lighting assembly.

17 Claims, 9 Drawing Sheets

AERIAL DISPLAY SYSTEM WITH FLOATING PIXELS

BACKGROUND

1. Field of the Description

The present invention relates, in general, to aerial displays and control of unmanned aerial vehicles (UAVs) such as multicopters, and, more particularly, to control methods and systems for using UAVs to provide a synchronized aerial display with floating pixels (or "flixels").

2. Relevant Background

In the entertainment industry, there are many applications where it is desirable to provide an aerial display. For example, an amusement park may have a lagoon or other open space over which it is desired to present a display to entertain visitors. In another example, massively large aerial displays may be presented at sport stadiums or other venues to celebrate holidays such as New Year's Day throughout the world and the $4^{th}$ of July in the United States.

While it is desirable to provide exciting and surprising shows, each large aerial display must also be presented in a safe manner. Further, for theme parks and other settings, it may be useful for the aerial display to be controlled and choreographed to be repeatable but adapted to be modified. For example, it may be useful to repeat a particular show for several weeks (e.g., during a particular holiday season) but then modify it to suit a new season or provide a differently themed show to attract repeat visitors.

Presently, aerial displays have been limited in how easy it has been to alter the choreography and to provide a repeatable show. Some "aerial" displays have relied upon very complex fountain systems to provide sprays of water upon which light may be projected or directed. These shows can be difficult to change or modify to provide a new show and are limited in the amount of the air space that can be utilized as the spraying water only reaches certain heights. Other aerial shows rely on fireworks, which can be dangerous to implement and often provide a different show result with each use. Other displays may use aircraft such as blimps dragging banners or even large display screens. While useful in some settings, these aircraft-based displays typically have been limited in size and use only a small number of aircraft and display devices.

SUMMARY

The inventors recognized that presently there are no mechanisms for creating very large aerial displays such as a display that is reusable/repeatable, dynamic, and interactive. To address this need, the following description teaches an aerial display system (and control method) that includes numerous unmanned aerial vehicles (UAVs) with display payloads and a ground control station for choreographing their movement and for controlling (in some cases) operation of the payloads to provide a dynamic display.

For example, the payloads may be controllable light sources along with a projection surface (e.g., a light diffusion cylinder). Each of these UAVs with its display payload may be thought of as a floating pixel or "flixel" that when combined provides a very large display screen or aerial display that may be three dimensional and may change over time as the UAVs move in the display air space and as the payloads operate to change their display (e.g., change color).

More particularly, a system is provided for performing an aerial display in a predefined air space. The system includes a plurality of UAVs each including a propulsion device and a display payload, and the system also includes a ground station system with a processor executing a fleet manager module and with memory storing a different flight plan and a set of display controls for each of the UAVs. Then, wherein, during a display time period, the UAVs concurrently execute the flight plans through operation of the propulsion devices and operate the display payloads based on the display controls.

In some embodiments, the display payloads each include a lighting assembly and a light controller. In such embodiments, the operating of the display payloads includes using the light controller to selectively operate the lighting assembly to provide an output light. For example, the output light is one of two or more colored light streams, and each of the display payloads further may include a light diffuser with the output light being directed onto a surface of the light diffuser. Further, the light diffuser may include a light diffusing screen extending about the lighting assembly, and the surface receiving the output light may be an inner surface of the light diffusing screen. In one particular implementation, each of the propulsion devices is a multicopter with a support structure upon which the display payload is mounted a distance apart from rotors of the multicopter.

According to another aspect, each of the propulsion devices may include a local control module and a communication mechanism for communicating with a neighboring one of the UAVs. Then, the light controller can be operable based on a comparison of an identification of the neighboring one with a predefined neighbor in the flight plan. In other cases, the flight plans are downloaded pre-flight to each of the propulsion devices. Then, during performance of an aerial display, the propulsion devices independently and concurrently execute the downloaded flight plans. In such cases, the display payloads of at least a subset of the UAVs can be operated in two or more states depending or based on progress of the UAVs along the downloaded flight plans. Further, it is sometimes useful for the flight plans to be downloaded pre-flight to each of the propulsion devices. Then, during performance of an aerial display, the propulsion devices independently and concurrently execute the downloaded flight plans, and the fleet manager module communicates instructions to each of the UAVs to control operation of the display payloads during the performance of the aerial display.

DETAILED DESCRIPTION

Figure 1:
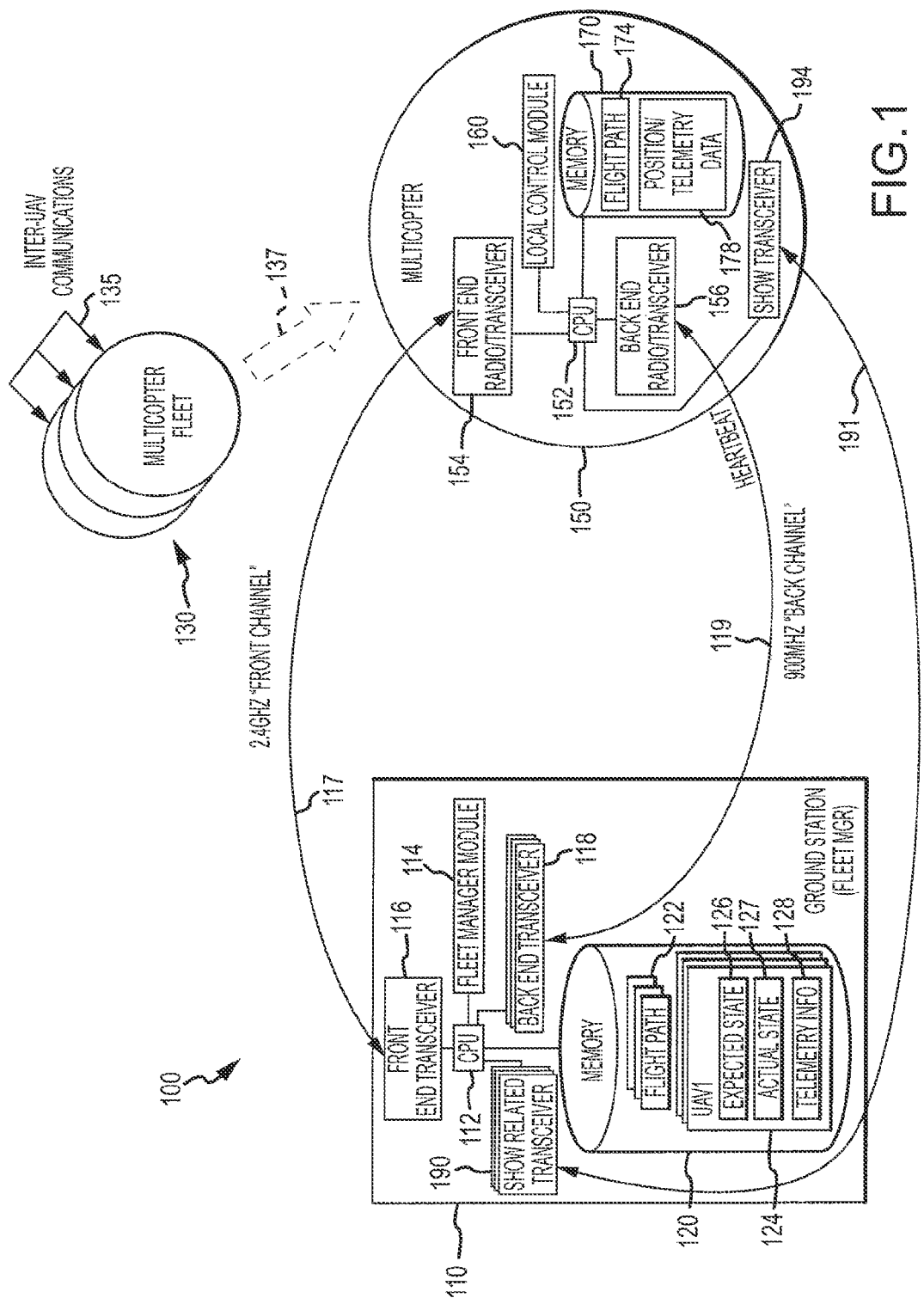
FIG. 1 is functional block diagram of a multiple UAV system useful for implementing the flight control techniques described herein.

Briefly, the present description is directed toward an aerial display system with a ground control station/system that wirelessly controls and choreographs movement of a plurality of unmanned aerial vehicles (UAVs) such as multicopters. Each of the UAVs carries a display payload such as a lighting assembly and display screen that can be selectively operated to display images or colors such that when an airspace filled with such UAVs is observed a colorful and dynamic aerial show is provided to the observers (e.g., a crowd circling a lagoon, an audience in a sports stadium, or the like).

The aerial display system makes use of the concept of a "flixel" or floating pixel (of a flying pixel object). The flixel or floating pixel assembly is provided by each UAV with its display payload, and the flixel is used to create dynamic aerial displays. In general, a pixel is the smallest element of an image that can be individually addressed or processed in a video display system. Likewise, the aerial display systems described herein make use of the sky or a predefined airspace as a display "screen," and the flixel is the smallest controllable element of the generated aerial display on or in this display screen/airspace. Many flixels may be controlled by a fleet manager module of a ground control system (GCS) to fly in a flocking and/or synchronized manner (non-swarming control) to create virtual 2D or 3D displays or to flash colors so as to mimic fireworks (e.g., to provide reusable/sustainable firework-type displays).

In brief, a flixel is a core component to create aerial displays based upon objects flying in the air while carrying a visual or display payload. The flying objects or UAVs are typically not held or controlled to be in a static or absolute position. Instead, the aerial display provided by the described system is dynamic both in the location of the display surfaces/screens of the payloads and in the color or other images projected upon the display surfaces/screens. In this manner, the combination of all the flixels provides a display "screen" that can change shape within a predefined area during operation (such as to have the UAVs fly over a lagoon or playing field rather than over the audience for safety reasons).

In general, a display payload may be a lighting assembly that may be able to provide light of a particular color or a range of colors (or even a projector-type device). The lighting assembly may be used alone or in combination with nearly any physical object that may be useful as a display surface or screen (e.g., a light diffusion cylinder that can be provided about the light source(s) of the lighting assembly).

The flying object may take many forms to selectively move a display payload within a display airspace. However, in some embodiments, the flying object is a UAV, which may be a multicopter. In such aerial display systems, a multicopter is modified or used to carry a controllable light source(s). Further, the display system may be controlled so that each multicopter is aware of other multicopters in their vicinity and is also able to be controlled by flocking logic via a ground station. In this manner, each multicopter with its display payload may be considered a flixel. Significantly, each flixel (or its multicopter) is aware of other flixels in the vicinity, and all units are controlled by a centralized display adapter (e.g., a fleet control module running/executed on a ground control system (GCS) or ground station).

Since a plurality of multicopters may be used to implement an aerial display system, it may be useful to first discuss a control method and system (or multiple UAV systems incorporating such control methods/systems) for use in controlling a flock of UAVs numbering 2 to 10 or more UAVs (e.g., 10 to 100 or more multicopters). This discussion of a control method may then be followed by specifics on particular implementations of aerial display system that may or may not use multicopters and the control method.

Briefly, the control method uses hierarchical-based supervisory control with multicasting techniques along with adaptive logic including onboard or local control modules provided on each UAV to adjust flight paths to safely avoid collisions based on communications with nearby UAVs. The result of the described control of the multiple UAVs in an airspace such as over a theme park or stadium is a flocking behavior in which the UAVs appear to move in a synchronized manner with movements that are not completely independent nor completely centrally controlled. The control method may be implemented in a system with four general components or pieces: a fleet management station (or ground station); flying objects or UAVs; at least dual-path communications between the ground station and the UAVs, e.g., much of the description below highlights use of dual-channel communication but some embodiments may use three or more transceivers onboard a UAV (such as to provide a front channel (supervisory), a back channel (autonomous), and a show channel (lighting, payload actuators, and so on)); and stage/show management. These four components or aspects of the control method/system are described below with reference to the figures.

First, with regard to dual-path communications, FIG. 1 illustrates a system 100 that may be used to control flying objects in a safe and repeatable manner. The system 100 includes a ground station or fleet manager 110 along with a plurality of multicopters (or UAVs) 130, with each being implemented (as shown via arrow 137) with the configuration of multicopter 150. As shown, the fleet of multicopters 130 is configured for inter-UAV or multicopter communications 135, and, as explained below, this intercommunication allows the multicopters 130 to safely react to a determination that another multicopter 130 is in a close proximity to avoid collisions while generally remaining on a predefined flight path. During runtime, ground station/fleet manager 110 is used for sending commands to maintain show performance and quality and to monitor safety information. During non-runtime, it uploads the show requirements.

Dual-path communication between the ground station 110 and the multicopter 150 is provided by each flying object or multicopter 150 having two communication channels shown at 117 and 119 in FIG. 1. To this end, the ground station 110 includes a front-end radio or transceiver 116 and a back end radio or transceiver 118, and the multicopter 150 also has two radios 154 and 156 configured for communicating 117, 119 with the station radios 116, 118. Some embodiments may further include a show radio or transceiver 190 in the ground station 110 that communicates over show channel 191 with a radio/transceiver 194 on the multicopter 150. The first or front end channel 117 provides a high speed communications channel (e.g., 2.4 GHz or the like) that is useful to provide choreographed movement of the multicopters 150 (e.g., when the UAVs 130 are not simply following a flight path but have time-synchronized movements from position to position in an airspace).

For example, the front channel 117 may be thought of as a robust, low-bandwidth "primary" channel for synchronized motion control and manual override control by the ground station. The back channel 119 may be thought of as a "secondary" high-bandwidth channel. The back channel 119 may be used for transmitting telemetry from the multicopter 150 to the ground station 110, for the ground station 110 to transmit signals for supervisory control of the multicopter 150, and for a back up communication channel should the front end channel 117 fail to one or more of the multicopters 150. Further, the show channel 191 may be used for non-flight-related communications.

The ground station 110 is shown to include a processor(s) 112 that runs software to perform the ground station control functions discussed herein such as the fleet manager module 114. The processor 112 controls operations of the radios/transceivers 116, 118 including managing memory 120 to store data received from the multicopter 150 over channel 117, 119. The memory 120 is shown to store flight paths 122 that may be downloaded or provided over front end channel 117 to the multicopter 150 (of those in fleet 130) for use by a local control module 160 to control movement of the multicopter 150 (e.g., via selectively throttling of motors turning one or more of the rotors). The memory 120 also stores a set or file of data 124 for each multicopter 150 of a fleet 130, and the data 124 may include an expected state 126 for the multicopter 150, an actual state 127 of the multicopter 150, and other telemetry data 128 (which may be passed via the back end channel 119 to the ground station 110).

Each multicopter 150 is shown to include one or more processors 152 that control operation of the two radios 154, 156 so as to process received data/signals on channel 117, 119 and to, as appropriate, store data in onboard memory 170. The processor 152 also may run or execute code, programs, or software such as a local control module 160 to function to perform the UAV-control functions described herein. The memory 170 may be used to store a flight path 174 provided by the ground station 110 and to also store determined positions and telemetry data 178 (that may be provided to the ground station 119 as shown in memory 128). The telemetry data 178 may include a heartbeat (each UAV in fleet 130 indicates to the ground station that is operational or "alive"). The telemetry data 178 may further include a present position of the multicopter 150 (e.g., a three dimensional location in the airspace) and the present speed of the multicopter 150. Further, the telemetry data 178 may include the health of any monitored components on the multicopter 150 and a battery life/status as well as other monitored data.

The fleet management component or module 114 acts to monitor the expected state 126 and the actual state 127 of each of the flying objects 150. For example, the module 114 may compare a present position or traveling speed of a multicopter 150 with its expected state 126 (which may be defined by a flight path 122 or a choreographed and time-synchronized movement of UAVs 130 such as in a light or other aerial display/show). Based on this monitoring, the fleet management module 114 may make adjustments such as using the following priorities: localization (e.g., position of the multicopter 150 with respect to other UAVs/multicopters); environment (e.g., to adjust for high wind conditions or the like); safety (e.g., return the multicopter 150 to a safe location or operating mode if it or other UAVs are not operating as expected); show performance (e.g., adjust position, speed, or other operating parameters to meet show needs); fleet status; and operator convenience/performance needs.

As discussed above, the fleet management module 114 and local control module 160 are configured to work together to provide flocking-type control. In use, the inter-UAV communications 135 are used to allow operational data to flow or spread hierarchically among the UAVs 130 rather than relying upon centralized/ground control alone. In other words, the fleet management module 114 provides a level of centralized control or central logic that acts to control the movement of the UAVs/multicopters 130 such as by providing flight paths 122 and/or making real time adjustments based on a comparison of expected state 126 and actual state 127 (or for safety reasons). With regard to inter-UAV communications, it may be useful to note the following: (a) some units may be designated as master nodes talking with the fleet manager; and (b) the master nodes may operate to send out in-flight calculated information or commands to remaining UAVs.

The movement/control is not swarm-based control in part because swarming UAVs can collide or have an inherent lack of safety and because the system 100 is designed to avoid random movements as want a flock or synchronized movements among the multicopters 130, 150. However, the inter-UAV communications 135 as processed and generated by the local control module allows each multicopter 150 to react safely to environment conditions such as increasing or direction-changing wind and presence/movement of neighboring multicopters 130, 150 as crossing flight paths is allowed in the system 100 (e.g., may be required by flight paths 122). In other words, the onboard logic 160 acts to control the multicopter 150 movements so as to avoid collisions while attempting to stay generally on the flight path 174.

Figure 2:
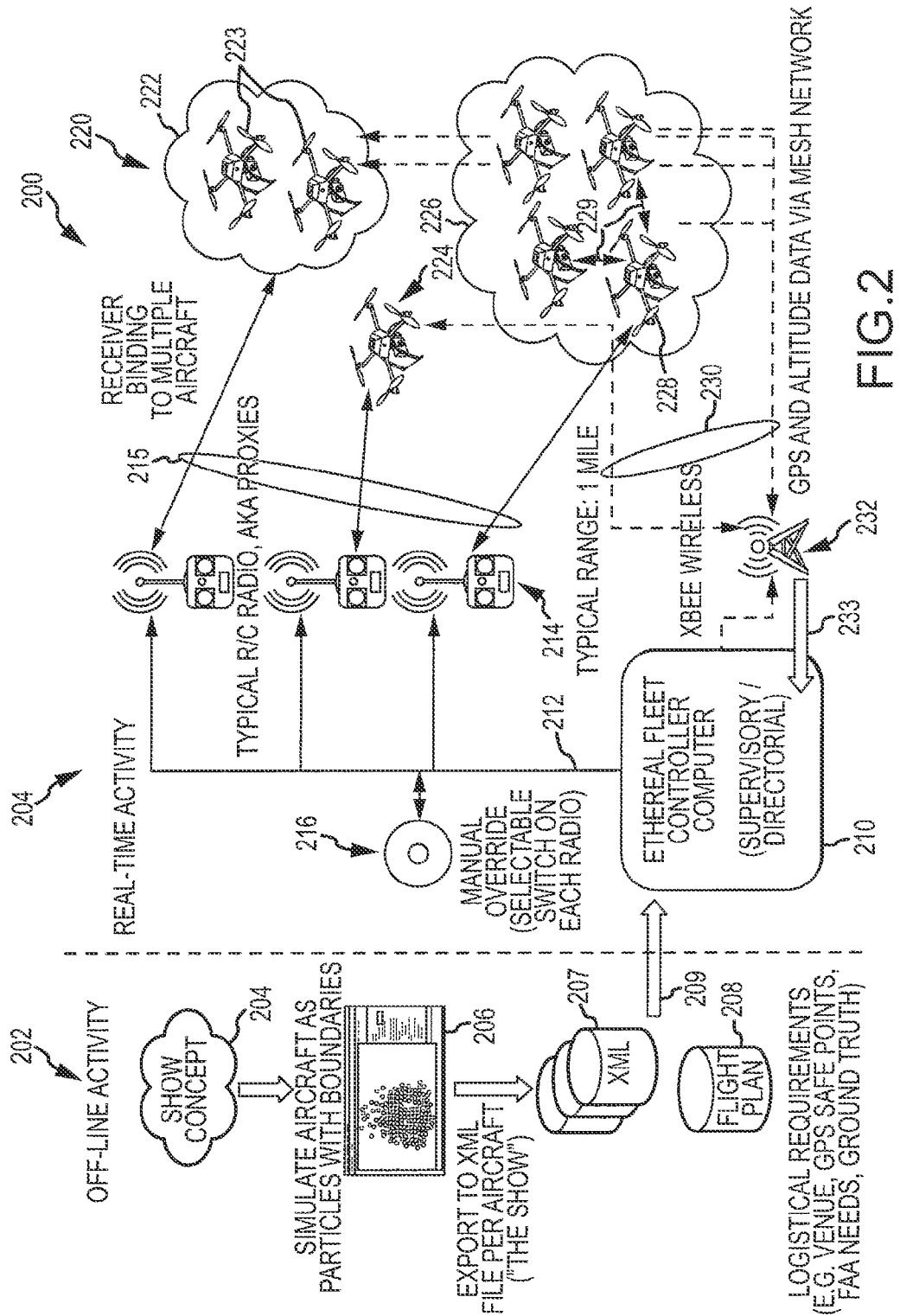
FIG. 2 is a functional schematic or block diagram of a system for use in providing flight management or flight control over two or more flying objects such as UAVs.

FIG. 2 illustrates a system (or a flight management control system) 200 for use in managing or controlling UAVs to provide an aerial vehicle flock with synchronized flight. The system 200 is shown to be made up of or include components used to perform off-line activity at 202 and used to perform on-line activity at 204. The off-line activity 202 may include designing or selecting a show concept or choreographed movement 204 for a plurality of UAVs to achieve a particular effect or perform a task(s).

The show concept (e.g., digital data stored in memory or the like) 204 may then be processed with a computer or other device to simulate as particles with spatial boundaries as shown at 206. For example, each multicopter to be used to provide an aerial display or show (or to perform an aerial task) may be modeled as a particle, and a three dimensional space such as a sphere with a predefined diameter may be used to define a safety envelope for that UAV or flying object. The safety envelope or space is used to reduce the risk of a collision between two UAVs (e.g., create and choreograph a show to avoid collisions and not allow two UAVs to have their safety envelopes intersect/overlap as the UAVs move along their flight paths).

The created show or task for the multiple UAVs is then exported to memory or other devices as shown at 207 for processing, with this "show" typically including a file per each UAV or unmanned flying object. Each of these files is processed to generate real world coordinates for each UAV to be achieved over time during a show (or performance of a choreographed task(s)). This processing creates individual flight plans 208 for each UAV, and such processing or generating of the flight plans 208 may include processing the modeled show 207 based on specific logistical requirements. These requirements for example may modify a show to suit a particular venue (e.g., is the air space the same size and shape as in the simulation and, if not, modification may be useful to change or set real world coordinates for one or more of the UAVs).

The logistical requirements may also include setting a ground truth for the venue and adding safe or "home" points (e.g., with GPS or other location settings) where each vehicle can be safely positioned such as at the beginning and end of a show or when a safety override is imparted (e.g., "return to home"). The stage/show management component 202 may be considered a component that translates central show controller commands, which may be a foreign system, to fleet actions that are sent 209 to the fleet management component either through scripts (e.g., data files), real time computer messages, and/or hardware triggers.

Figure 3:
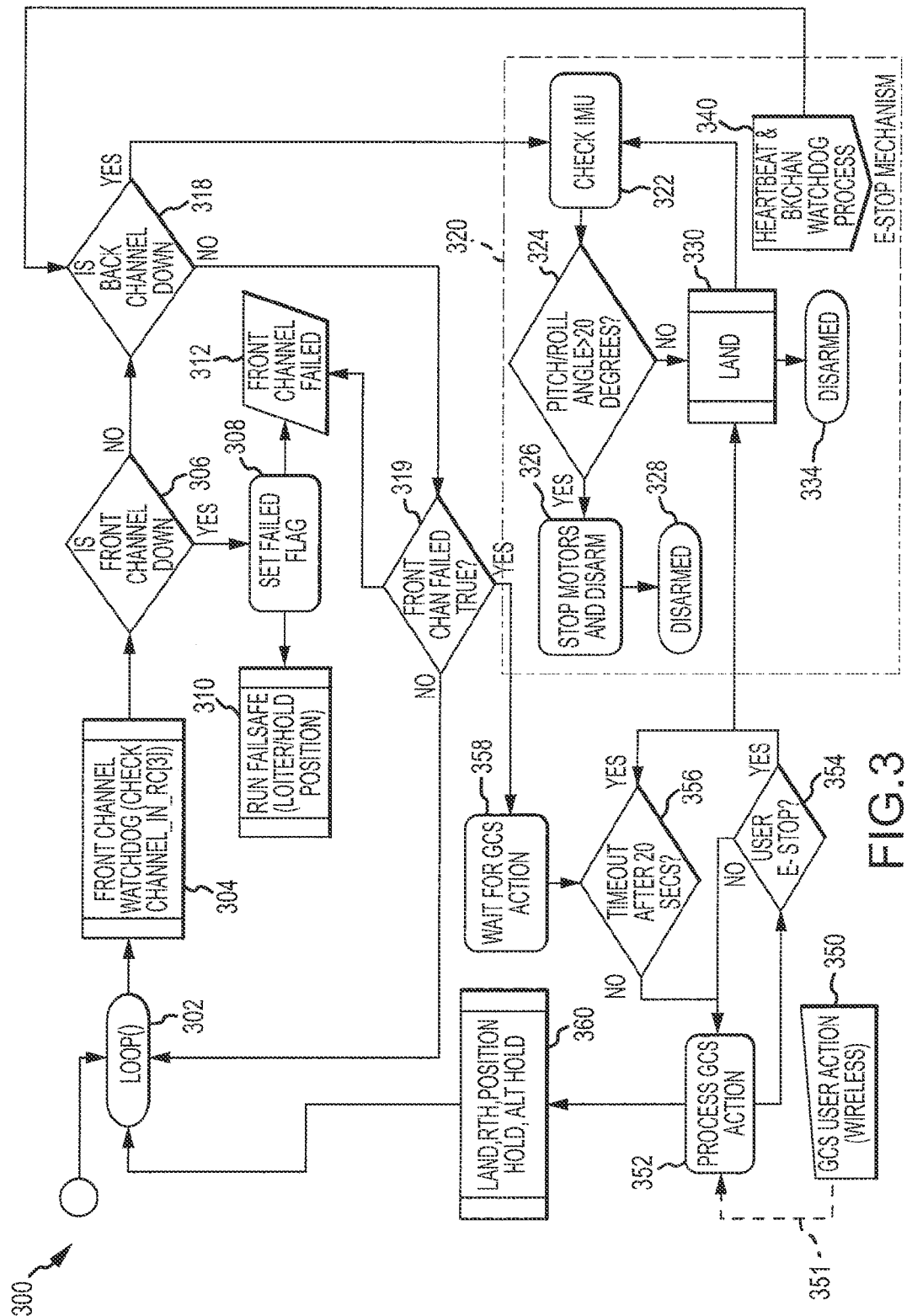
FIG. 3 provides a logic diagram for the onboard logic running or provided for execution on each UAV such as part of a multicopter control panel/board.

At 209, the flight plans are provided to the ground station 210 (or ethereal fleet controller/computer or ground control system (GCS) as used in FIG. 3). The system 200 further includes a number of UAVs 220 shown in the form of multicopters in this example. The multicopters 220 may be in groups/sets with set 222 shown to include two copters 223, set 224 including one copter, and set 226 includes four copters. These sets may act or function together, at least for a portion of a show or flight path, to perform a particular display or task.

In other cases, all of the multicopters may be considered part of a large set that moves as a flock or otherwise has its movements time synchronized and/or choreographed by flight plans 208. As shown at 229, a multicopter 228 in the group 220 can communicate with its nearby or neighboring multicopters so as to determine their presence, to determine their proximity, and when needed, to process the flight plan, determined neighbor position, and other environmental data to modify their flight plan to avoid collision and/or communicate 229 with the neighboring multicopter to instruct it to move or otherwise change its flight plan/movement to avoid collision.

As discussed with reference to FIG. 1, the system 200 also includes two communication channels between the GCS 210 and each of the multicopters 220. The front end channel is shown at 212 with the GCS using remote control radios or wireless transceivers 214 to communicate data/control signals 215 to each of the multicopters 220. In this manner, the GCS or receiver 210 binds to multiple aircraft so as to allow multicasting of control signals such as to wirelessly load flight plans 208 to each of the multicopters 220 before flight operations are initiated by the GCS 210.

In some cases, a manual override (selectable switch, for example, on each radio 214) 216 is provided to allow an operator to signal 215 a particular multicopter 220 to switch to safe mode (e.g., to return to home, to safely drop to ground, and so on). The back end channel for communications is shown at 230 with each of the multicopters 220, which may have two or more radios as discussed with reference to FIG. 1, communicating telemetry or other data (e.g., GPS and altitude data via a mesh network) to the GCS 210 as shown to be relayed 233 via a wireless transceiver device 232 (e.g., with a range when working with UAV radios of about 1 mile). Each multicopter 220 may include a unique identifier or ID with their telemetry data (e.g., the same ID as used to associate a flight plan 208 with a particular multicopter 220).

In system 200, each of the flying objects 220 may be a multicopter that optionally may be modified to carry a variety of payloads (or units). For example, the payload may be one or more light sources. The payload may include the communication devices, e.g., two or more radios discussed herein, to provide multiple communication channels. Any communication channel may be linked to the GCS 210 (or its fleet management module discussed above with reference to FIG. 1). In one implementation, the multicopters 220 were each modified via software (e.g., local control module 160 in FIG. 1) to provide all the logic (e.g., see FIG. 3 and corresponding discussion) required for operation in a show environment including flocking logic, safety strategies, light show scripts, character expression logic, and alternative show maneuvers.

FIG. 3 illustrates a flowchart or logic diagram of a safety control method or logic 300 that may be implemented on board each multicopter or flying object (e.g., via the local control module 160 as shown for a multicopter 150 in FIG. 1). In the safety process 300, a process loop begins at 302 and a first step may be to perform a check of the front end communication channel at 304. At 306, the process 300 continues with determining whether the front channel is still up/available or is now down. If determined at 306 to be down, a flag is set at 308 indicating the front end communication channel has failed as shown at 312.

At this point, the process 300 may continue at 310 with controlling the multicopter in a failsafe mode as shown at 310, and this may involve having the multicopter loiter or hold its present position for a preset period of time, until the front end channel is available (as determined by repeating step 304), or until instructed otherwise by GCS user action 350 (e.g., an operator may identify a loitering multicopter in the group/flock and instruct it to take certain action such as to return to home (RTH)).

The process 300 may include an emergency stop cycle or subroutine 320. In the stop cycle 320, an ongoing (frequent periodicity) step 340 such as obtaining a heartbeat of the multicopter may be performed. In this step 340, the logic/processor onboard may transmit an "alive" pulse/signal to the GCS and also determine its present position and other telemetry, which is also transmitted to the GCS via the back end communication channel. As part of step 340, a check is performed to determine a status of the back end channel to the GCS. The following are examples of multiple modes of failure that may result in different reactions: (a) show failure (e.g., missed waypoint) to which the system may respond by adapting to stay safe and continue flight; (b) front channel communication failure to which the system may respond by going to autonomous mode to stay safe and possibly cancel a show if needed; (c) back channel communication failure to which the system may respond by waiting for confirmation and hold in place until communication is reestablished (if not, then land); and (d) full communication failure to which the system may respond by landing in place.

After step 340 is performed, the method 300 continues at 318 with a determination of whether or not the back channel is down. If not, the method 300 can continue at 319 with a determination of whether or not the front channel flag 312 is set. If not, the method 300 can return to perform another loop 302. If the front end flag is set at 312 (fail is true) as determined at 319, the method 300 may continue at 358 with waiting for a control signal or action to be performed by the GCS (e.g., an operator uses the GCS to transmit a control signal). At 356, a determination is made regarding a timeout after a preset period of time.

If the timeout period has not elapsed, the method 300 continues at 352 with processing of a GCS action that is provided by wireless signal/transmission 351 from the GCS 350. A user or operator may provide input at a ground station or GCS to perform a user-initiated emergency stop, which is checked for at 354. If an e-stop is not issued in the transmission 351 as determined at 354, the method 300 may continue at 352 with further processing of the action 350 such as to determine that instructions have been received to operate the multicopter in a particular manner.

These responses/actions are shown at 360 with the local/onboard control logic acting to land the multicopter, to return the multicopter to home, to hold the present position (but changing altitude is allowed), to hold altitude (but wind or other environmental conditions may cause position to change over time), or other action. This step 360 is followed with a new control/safety loop 302. In this manner, a user can provide at 350 override or direct control signals to each multicopter that can override a program/flight plan at any time or in response to loss of the front end communication channel. When a timeout period has elapsed at 356, the e-stop cycle 320 may be performed. In particular, the onboard logic may act to land the multicopter as shown at 330 if no GCS action is received within the present time (e.g., 10 to 30 seconds or the like).

The e-stop cycle 320 may also be initiated when it is determined by the onboard control logic at 318 that the back end channel is down. In such a case, step 322 is performed to check the IMU and then determine at 324 whether the pitch or roll angle is greater than some preset acceptable limit (e.g., 15 to 30 degrees or more). If this pitch is not exceeded, the e-stop cycle 320 continues at 330 with landing the multicopter. If the pitch or roll angle is greater than the preset maximum at 324, the e-stop cycle 320 continues at 326 with stopping the motors and otherwise "disarming" the multicopter to place it in a disarmed state at 328 (at which point the multicopter will fall to the ground rather than gently landing as is the case at 330).

With the above discussion and general discussion of a flight control system (system 100 and 200) understood, it may be useful to more specifically discuss functions of particular components of such a flight control system and the onboard logic and controls of each multicopter or other UAV. With regard to the ground control system (GCS), the GCS controls preflight, show state, and safety.

During preflight, an operator uses the GCS to load a flight plan onto each UAV (e.g., transmitted wirelessly via the front end channel for storage in memory accessible by the local control module of the UAV). During a show, the GCS and its fleet manager module acts to run the flight plan previously loaded on the UAV. This "running" may involve an operator using a trigger module or mechanism of the fleet manager module to say start or "go" to initiate all the multicopters or UAVs to begin to run a flight plan. Typically, before this step, each UAV is placed at a ground location for takeoff or at an aerial home position, with these home or start positions being included in the overall flight plan for a show or to perform a task as a flock of UAVs.

During the show, the GCS actively monitors safety and an operator can initiate a GCS user action as shown in FIG. 3. More typically, though, the GCS monitors the operation of all the UAVs in the flock by processing the heartbeat and telemetry data provided by each of the UAVs via the back channel communications from the back end radio or transceiver provided on each UAV. In some embodiments, the fleet manager module has software/logic that compares the actual state of each UAV against the expected state at that particular time for the UAV according to the presently enacted flight plan.

If the actual state does not compare favorably (e.g., the position of the UAV is outside an acceptable range such as several-to-many feet off course), the fleet manager module may generate an alert (audio and/or visible) on a GCS monitor or other linked device to warn an operator of this possibly unsafe condition. At this point, the warned operator may take action (user action in FIG. 3) to correct the operations of the UAV(s) or to instruct the UAV to return to home or take other actions.

For example, the fleet manager module may allow the operator to select or "hit" a safety button (or selectable icon), and the fleet manager module would communicate via the front end or back end communication channel to instruct the UAV to go into a predefined safety mode of operation (e.g., see box 360 of FIG. 3). This safety mode instruction or GCS is processed by the local control module on the UAV, with the UAV drive system correspondingly operated to position the UAV in a safe location or mode of operation. Such a safety mode/operation can be issued on a per UAV basis or to the entire flock concurrently (or even to a subset of such a flock). In some embodiments, the fleet manager module actively negotiates with each UAVs local control module (or its subroutine handling safe operations); in other words, hitting the "safety button" on the GCS does not necessarily require the affected UAV to immediately take action as the UAV control system may act to complete a task or first attempt a control adjustment to correct its operations prior to allowing GCS override (such as causing the UAV to return-to-home).

After the "go" or start signal is issued by the fleet manager module/GCS upon an operator input, the GCS along with the local control software/hardware on each UAV work to safely perform the preloaded flight plan/show. As discussed above, the control method and system taught herein combines centralized control (e.g., to allow manual override for safety or other reasons during a show/flight-based task) with smart UAVs to more effectively provide flock-type movement of the UAVs. In other words, the UAVs may each be given a particular flight plan that they work toward over time (during a show time period) while attempting to respond to environmental conditions such as changing wind or the unexpected presence of another UAV within or near to their safety window (or safe operating envelope surrounding each UAV such as a sphere of several-to-many feet such as 10 to 30 feet or the like in which no other UAV typically will travel to avoid collisions).

During operations, the GCS is used to trigger each of the UAVs to begin their stored flight plan starting from a home or show/task start point (e.g., each UAV may be placed at differing launch points or be hovering/flying at a particular ground point at a predefined start altitude). In some cases after the "go" is received by a UAV, each UAV uses its local control module (or other software/programming) to attempt to follow the flight plan but with no time constraints. In other words, the flight plan may define a series of earth points or way points along with elevation/altitude values for the UAV. In these embodiments, the UAV is controlled in a relatively fluid manner and not tied to accomplishing tasks in a certain amount of time (e.g., the flight plan does not require the UAV be at a particular location at a particular time after the go signal is received).

In some implementations such as those using multicopters for the UAVs, the flight plan is built up assuming that each UAV travels at a preset and constant flight speed. This flight speed may be set independently for each UAV or may be the same (or within a relatively small range) for each of the UAVs. In other cases, though, the local control module may be adapted to adjust the flight speed to suit the environmental conditions.

For example, stronger winds may make it beneficial to speed up (or at least operate rotors of a multicopter) when moving against a strong head wind and to slow down when moving with the strong tail wind. The speed of the wind may be determined at the UAV with the local control module and sensors provided as part of the payload or the wind direction and speed information may be provided by the GCS to each of the UAV. In some case, flock control is preferred such that each UAV has its speeds adjusted commonly, e.g., each UAV runs at like flight speeds while moving in a like direction so as to appear to have synchronized and non-random movement.

In some embodiments, each UAV acts independently to try to continue to follow its own flight plan. Each flight plan differs at least in the fact that each UAV begins at a differing start point or home and moves toward its first way point. To this end, each UAV is equipped as needed to determine its present three dimensional position that includes a latitude/longitude position (e.g., a GPS position or similar position data) along with its present altitude or height above the ground. The local control module uses this present position data to determine and modify (if necessary) its present direction or heading to continue to move toward the next way point in its flight plan. This may involve changing it course and also its angle of attack to reach the desired height at the way point.

Generally, the GCS monitors for safe operations of the UAVs as discussed with reference to FIG. 3, but an operator may take steps to manually override a particular one of the many UAVs to provide better control of that UAV. For example, the fleet control module of the GCS may operate to compare an expected position of the UAV with its actual position (provided via back end channel in its telemetry or other data). A warning may be provided in a GUI that the UAV is trending off course or is outside an accepted tolerance for reaching its next way point.

For example, the GUI may show properly operating and positioned UAVs in green, UAVs that are off course or out of position a safe amount in yellow, and UAVs outside of a safe envelope in red. The red/unsafe UAVs may be handled automatically or manually to cause them to enter a safe mode of operation (return to home, for example). The yellow UAVs that are operating outside of desired conditions, though, may be manually operated to try to assist them in returning to their flight path such as by manually changing speed, direction, angle of attack, or the like to more quickly bring the UAV to a desired way point. After manual operations are complete, the control may be returned from the GCS to the local control module for local control of the UAV based on the flight plan stored in its memory. Note, the GCS may be configured to evaluate collision issues and execute collision avoidance commands to preserve show quality (i.e., flight performance) in degrading weather conditions.

In other embodiments, a local control module of a UAV may operate to adjust the flight plan during flight to better react to environmental conditions (such as gusts of wind that may throw it, at least temporarily, off course). For example, a flight plan may provide a time relative to a start time (when "go" was signaled by the GCS to the UAVs) to reach each of its way points on the flight plan. One embodiment may call for the UAV to determine a distance to a next UAV and its present estimated time of arrival (e.g., using changes in its earth position to determine its true speed or rate of travel). If the time of arrival is not within a window about a preset/goal arrival time, the local control module may act to increase the flight speed of the UAV such as by increasing the rate of rotation for the rotors of a multicopter. Likewise, if the UAV is moving too quickly (e.g., strong tail wind), the UAV's local control module may act to slow the flight speed. In this manner, the movement of the UAVs may remain better synchronized to provide a flock control.

In other cases, though, the local control module of the multicopter or other UAV acts to determine whether or not a way point was reached within a predefined time window, with the flight plan defining times for being at each way point relative to a start/go time. If not (e.g., did not reach a way point at Time "X" plus an allowable delay), the local control module may act to modify the flight plan by directing the UAV to skip the next way point and fly directly to the way point following the next. For example, a flight plan may include way points A to Z. If a local control module determines that a predefined time window for way point C was not achieve, the local control module may skip or remove way point D from the flight plan and cause the UAV to take a direction/course (e.g., a straight line or other predefined path) to way point E. In this way, the flight speed is maintained (e.g., all UAVs fly at the same speed) while allowing the UAV to "catch up" if they fall behind their flight plan (e.g., defining a set of way points or earth points to pass through or nearby within a predefined time period that may correspond with a time to perform a show/display or perform a task with the multicopters).

With regard to safety and monitoring of operations, each UAV may store a definition of a geofence that defines an outer perimeter (and an inner area in some cases) or boundary of a geographical area. The UAV's local control module compares the present position determined for the UAV during a flight and compares this position to the geofence. If this boundary is crossed (or is being approached such as within a preset distance from the geofence), the local control module may act to promptly return the UAV back within the geofence boundaries. In other cases, the UAV may be switched into a safe operating mode (as discussed with reference to FIG. 3), and this may cause the UAV to return-to-home or otherwise safely return to ground (or other safe holding position). For example, the geofence may define the boundaries of a lagoon or stadium field, and the UAVs may fly over this geographical area (or within an area offset from the physical boundaries of this area to define a somewhat smaller area) but not outside it so as to avoid flying directly over any people in an audience to provide enhanced viewing safety.

Further, regarding safe UAV operations, some embodiments of the flight control method and system involve configuring the UAVs to have UAV-to-UAV (or multicopter-to-multicopter) communications or other technologies provided onboard to avoid collisions without reliance upon the GCS to intervene. Each UAV may use its local control module to operate on an ongoing basis to detect when another UAV comes within a predefined distance from the UAV such as within a sphere of 10 to 30 feet or the like. The first UAV to detect such a condition (or both UAVs if a tie) generates a collision warning message and transmits this message to the offending/nearby UAV to alter its course or present position to move out of the first UAV's air space. For example, the UAV receiving such a collision warning message may store an evasive action in its memory and initiate this action (a fixed movement such as angling to the right or left a preset angle). The evasion may be taken for a preset time period and then the UAV may return to following its flight plan (e.g., recalculate a course to the next way point from its new present location or the like).

As discussed with regard to FIG. 3, the local control module of each UAV may perform other functions to control its own flight to ensure safe operations. For example, the local control module uses a front end radio and a back end radio to communicate with the fleet manager module of the GCS. The status of these communication channels is monitored by the local control module, and, when either communication channel is detected to be lost (e.g., an expected receipt confirmation from the GCS is not received to a transmission of a telemetry data by a UAV), the local control module may react to this loss of communication by entering a safe operating mode (e.g., land, return to home, hold position, or the like).

In another example, the UAV's local control module monitors the present orientation and/or altitude of the UAV and if the orientation is outside an acceptable range (e.g., pitch or roll exceeds 20 degrees or the like for a multicopter) or if the altitude is too high or too low, the local control module may also act to enter the UAV into a safe operating mode (before or after attempting to correct the operating problem).

Figure 4:
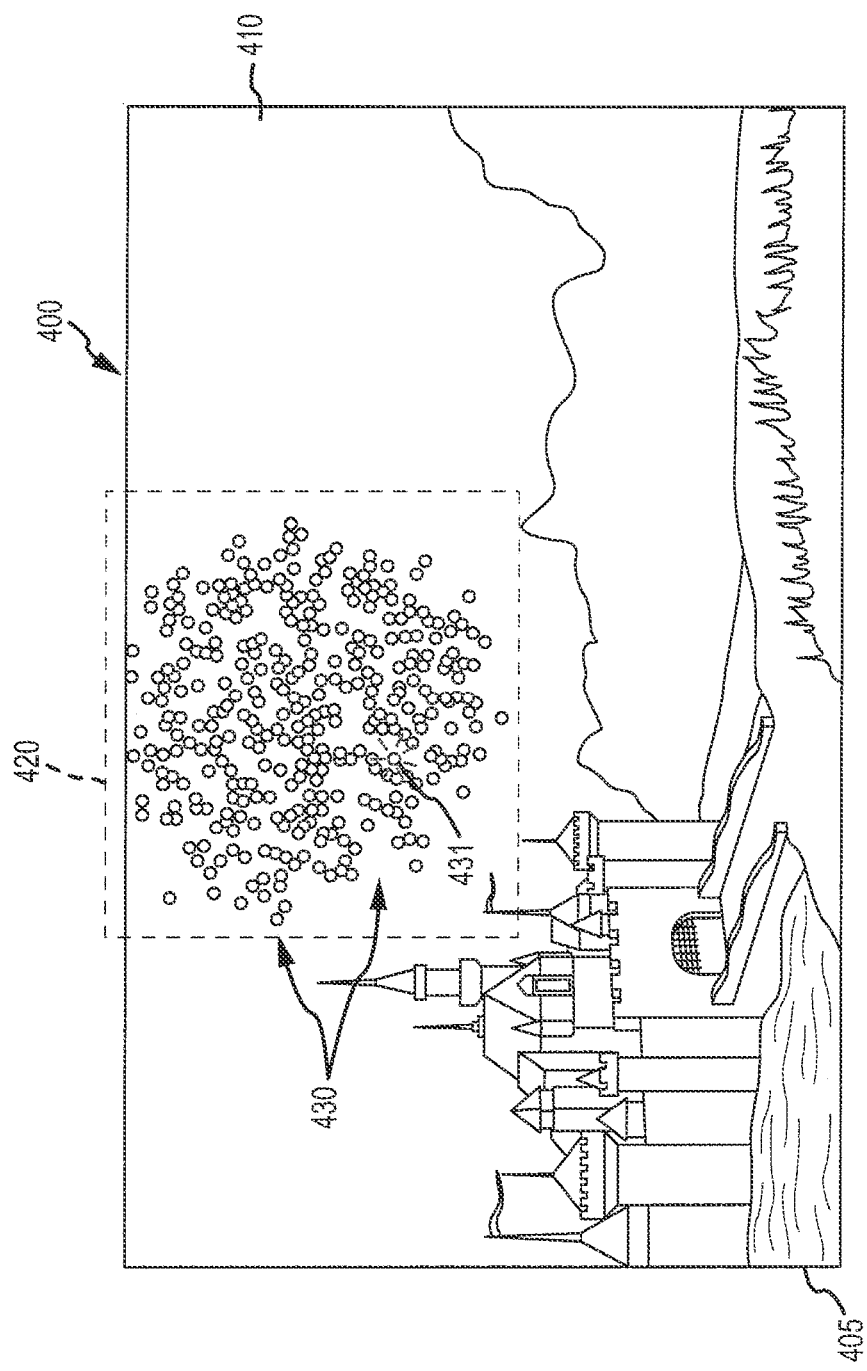
FIGS. 4 and 5 illustrate an exemplary aerial display system of the present description during use to provide an aerial light show with numerous flixels (flying pixels assemblies)

With the above understanding of control of UAVs understood, it may be useful to again turn to a discussion of aerial display systems making use of the flixel concept. FIG. 4 illustrates an aerial display system 400 during its use to provide an aerial display, e.g., a very large area light show. The system 400 is shown to include a large number (e.g., 20 to 200) flixels 430 that would be controlled as discussed above by a GSC (not shown) and also through onboard logic as well as flixel-to-flixel communications (as discussed above for safety purposes and as discussed below with regard to maintaining show quality).

The flixels 430 are shown to be flying or at least hovering in the airspace 410 above a geographic area 405 such as a portion of a theme park or the like where a large audience may gather to watch an aerial display. The flixels 430 carry a payload such as a lighting assembly along with a display screen/object that may be operated as shown at 431 to provide a steady or flickering light of the same or multiple colors (or to provide a video or dynamic light stream). The light 431 provided by each flixel 430 may vary over time similar to a pixel of a display screen/device to provide a desired image or a flixel may be turned on and off as useful to create a changing image.

The aerial display provided by system 400 is provided within a display space or "air-based screen" 420 within a predefined portion of airspace 410. During use, the flixels 430 may each move about within the display space 420 to change the imagery or aerial display while providing the same or differing output light 431. The size of the display space 420 may be quite large such as 50 to 100 yards or more per side on a two-sided (or 2D) screen 420 or on a three-sided (or 3D) screen 420. The flixels 430 may be controlled via a fleet manager module of a GSC to follow a downloaded flight plan with onboard logic (e.g., a local control module) so as to move in a synchronized manner such as with flock-like control.

For example, the flixels 430 may first be used to display the face of a first popular character and then second be controlled to display the face with a changed expression or to display a face of a second character. The second display or animation may be provided by moving all or a subset of the flixels 430 to new locations in the display space 420 and/or by changing the operation of the lighting assembly of all or a subset of the flixels 430 to provided differing light outputs 431 (e.g., differing flixels are lit or illuminated with a different color such as in a red-blue-green arrangement as in many pixel-based display devices but in the airspace 410).

Figure 5:
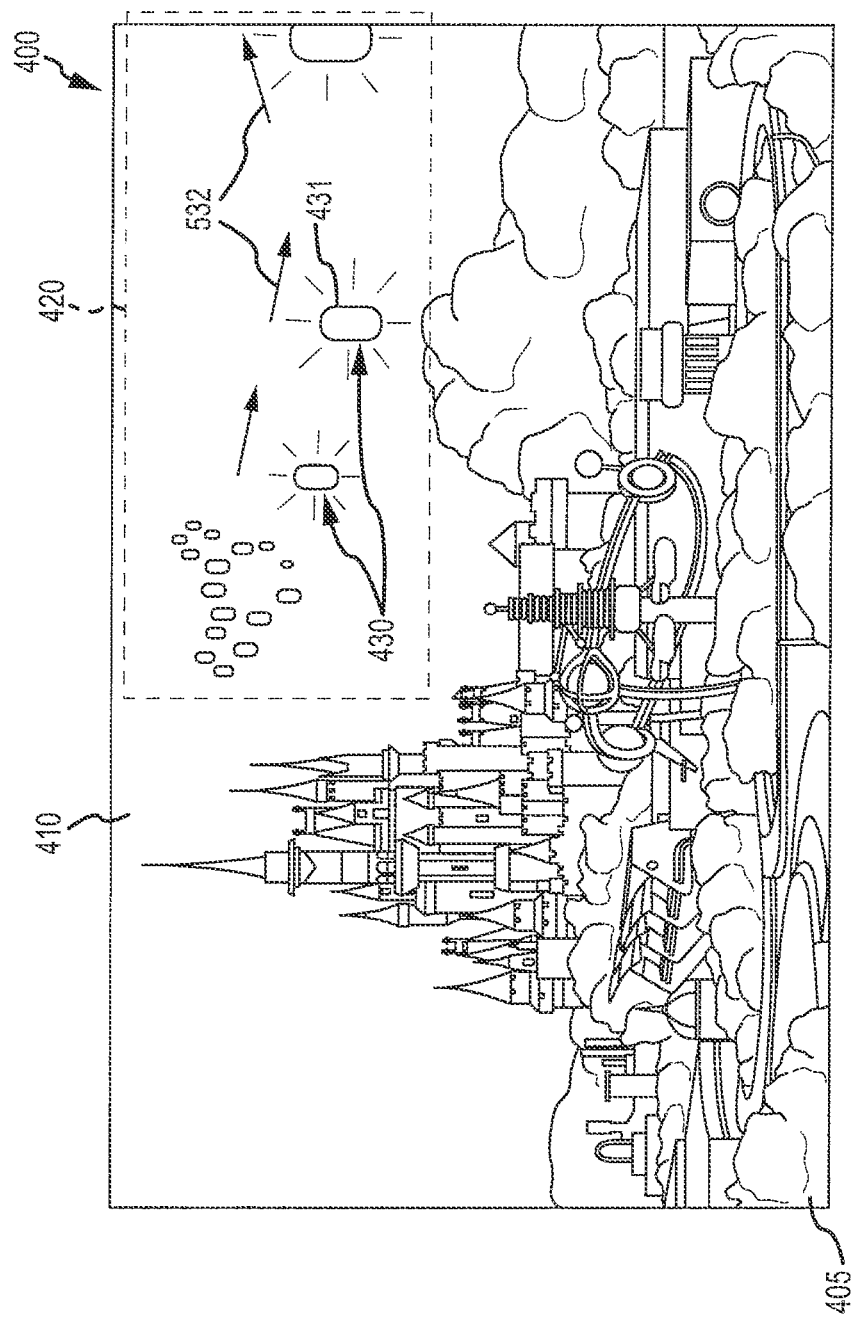

FIG. 5 illustrates the aerial display assembly 400 at a second operating state some period after the operating state shown in FIG. 4. In this second operating state, the display space/screen 420 is shown to have changed in shape and size in the airspace 410. To achieve this change in the display screen shape, at least some of the flixels 430 (e.g., a subset) are shown to be moving 532 along a flight path that stretches or reshapes the display space/screen 420. As will be appreciated, the size and shape of the display space 420 is defined by outermost ones of the flixels 430, which may be moving 532 so as to provide a display space/screen 420 that is dynamic.

Further, the flixels 430 may be operated to have some of the light assemblies in their payloads change the color of the light 431 that is output or otherwise change the resulting display 431 of the payload. In these two ways, the aerial display system 400 with flixels 430 can be dynamic in the visual effect (e.g., by changing colors/imagery at each flixel 430 which may also move) and also used to provide a large display with a display space/screen 420 that can change its shape, its size, and its location over a geographic area 405 (move its X-Y coordinates and/or its elevation).

Figure 6:
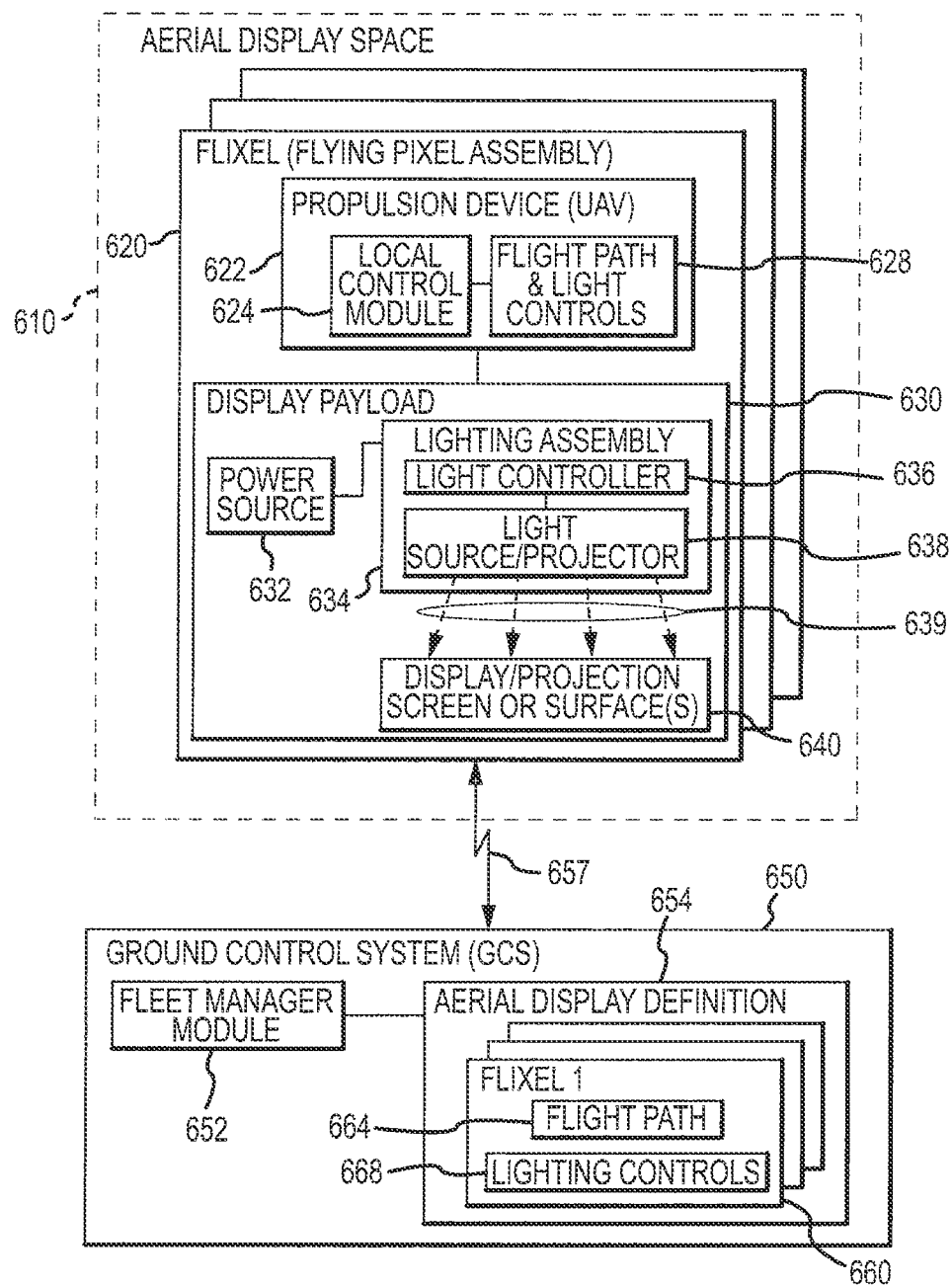
FIG. 6 is a functional block diagram for an aerial display system of an embodiment of the present description.

FIG. 6 provides a functional block diagram of an exemplary aerial display system 600. The system 600 uses an aerial display space 610 such as a 3D space above a sports stadium, a park, or an area of an amusement park or city to provide an aerial display such as a light show. The aerial display is provided by a plurality (e.g., several-to-many (e.g., up to 100 or more)) of flixels or flying pixel assemblies 620. The display space 610 may be considered the safety envelope for the flixels as discussed above for controlling UAVs or may be more generally thought of as the outer perimeter defined by the present location of the flixels 620.

Each flixel 620 is able to fly and, to this end, includes a propulsion device 622, which may take the form of nearly any UAV such as, but not limited to, a multicopter. As discussed with multicopters 150 in FIG. 1, the propulsion device 622 includes local processors and logic to provide local control of the flixel 620. For example, a local control module 624 may be provided that functions to execute a flight path and/or lighting controls 628 (which may be downloaded prior to flight or may be provided during a show/display as discussed with regard to FIGS. 1 and 2).

The flixel 620 further includes, though, a display payload 630 that may be configured such that the combined visual effect of the flixels 620 flying in the display space 610 is a desired aerial display. The payloads 630 may be as simple as a colored banner or object (of nearly any shape and size) that when positioned in a location in the display space 610 with other ones of the display payloads 630 provides a desired display/imagery. In other cases, as shown, the display payload 630 includes a lighting assembly 634 powered onboard with a power source 632 (e.g., a battery).

The lighting assembly includes a light controller 636 that controls operation of a light source/projector 638. For example, the light source 638 may be made up of a number of colored lights such as light emitting diodes (LEDs), and the light controller 636 may act to selectively operate particular ones of the LEDs in the light source 638 to output 639 a particular color(s) of light. The local control module 624 may use timing and color selection information in the light control data 628 to locally control the lighting assembly 634. In other cases, though, wireless signals 653 are provided by a ground control system (GCS) 650 to implement lighting controls 668 for a particular display/show 654. For example, signals 653 may be provided to synchronize lighting changes for the various flixels 620 with a concurrently playing audio track.

The display payload 630 further includes a display or projection screen (or surface(s)) 640. This may be a planar sheet of fabric such as a rear projection or front projection element. In other cases, the screen 640 may be provided to fully or partially enclose the light source 638. For example, the display surfaces/object 640 may be a hollow sphere, cylinder, elongated blimp-like shape, rectangular, or other shaped enclosure, and this enclosure may be formed from light diffusing material so as that the entire object 640 becomes illuminated when its inner surfaces receive the output light 639. In one preferred embodiment, the display payloads 630 (or flixels 620) appear to be flying lanterns with the propulsion device 622 being a multicopter and the controller 636 being a wireless controller communicating 653 with the GCS 650 to provide remote control/operation of the lighting assembly 634.

As discussed with reference to FIG. 1, each flixel 620 (instead of a UAV/multicopter 150 in system 100) may be controlled in part from a ground control system (GCS) 650 via two channel communications 653. The GCS 650 may take the form shown for station 110, and the GCS 650 includes a fleet manager module 652 that functions to control the flixels 620 based on an aerial display or show definition 654 (stored in the memory of the system 650 or accessible by the system 650).

The display definition 654 includes control data 660 for each flixel including a flight path/plan 664 for the flixel during a display or show (e.g., the flight path and dynamic control may be similar to that discussed for UAVs above with reference to FIGS. 1-3). Further, in some cases, the display definition 654 may include lighting controls 668 for each flixel 620, and this data 668 may be downloaded wirelessly 653 before a display/flight. In other cases, though, the lighting controls 668 are used on an ongoing basis by the flight manager module 652 to transmit lighting control signal 653 to each of the flixels 620 as needed to synchronize operation of the lighting assembly 634 of each payload 630 (with other payloads of other flixels in space 610) to achieve a desired light show/display in space 610.

Figure 7:
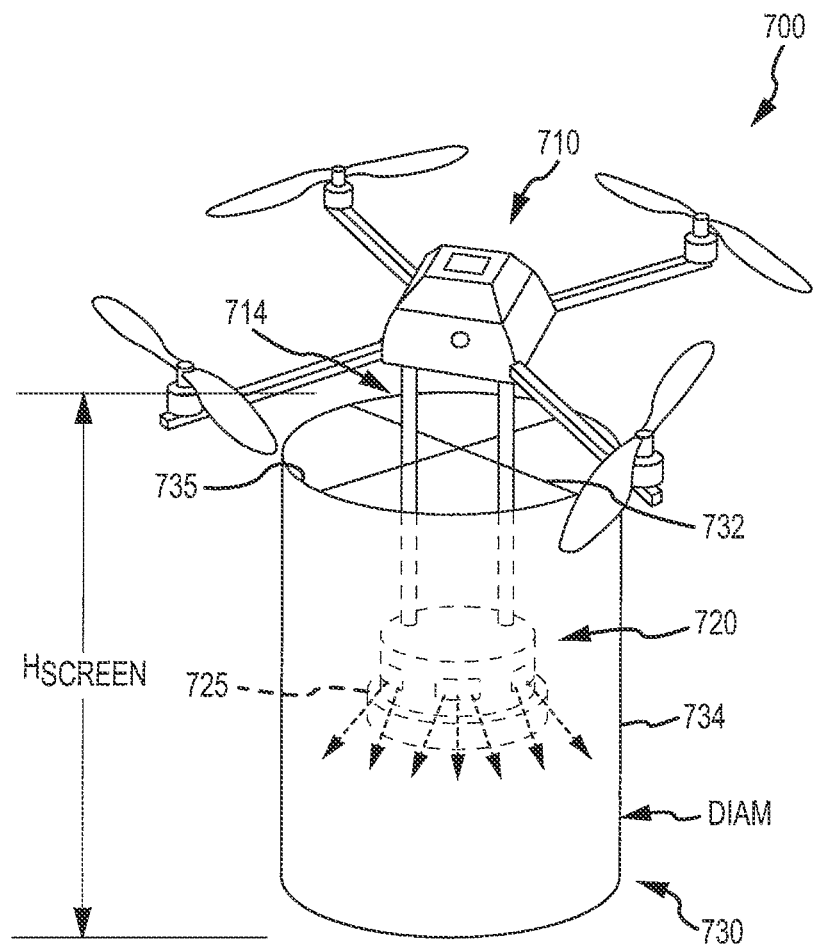
FIG. 7 is a perspective view of an exemplary flixel or flying pixel assembly including a multicopter with a display payload providing a lighting assembly and display screen in the form of a light diffusion cylinder.

FIG. 7 illustrates one embodiment of a flixel or flying pixel assembly 700 that the inventors have successfully prototyped in an aerial display system as described herein. In the assembly 700, the propulsion device is a multicopter 710, which may be controlled as discussed above with reference to FIGS. 1-6. The display payload of the assembly 700 is provided by the combination of a lighting assembly 720 that is positioned within light diffuser 730.

The lighting assembly 720 is carried beneath the body of the multicopter 710 with payload support structure or frame 714. The lighting assembly 720 is shown to include a plurality of lights such as red, green, and/or blue (or other colored) LEDs that may be concurrently or separately operated or lit to provide the projected or output light 725 of the lighting assembly 720 (e.g., selectively provide a particular color to allow the assembly 700 to act as a floating or flying pixel in a larger aerial display including numerous flixels 700).

The lighting assembly 720 is shown to be supported within the hollow center space of the light diffuser 730. The light diffuser 730 includes a screen or sheet 734 of light diffusing material (e.g., a plastic, a cloth/fabric, a material used to provide a rear projection screen, or the like), and, in this embodiment, the screen/sheet 734 is shaped into a cylindrical shape with a height, $H_{Screen}$, and a diameter, Diam (such as 12 to 36 inches in height and 6 to 24 inches or more in diameter). The screen/sheet 734 is configured such that when the output light 725 from the lighting assembly lights strikes the inner surface(s) 735 the diffuser 730 generally appears as a cylindrical light.

In other words, the flixel 700 in operation may appear to be a flying cylindrical lantern that is illuminated white or another color (which may change during a display or show via control signals from a GSC or local controller of the multicopter 710) or, when the light sources are projectors, the diffuser 730 may project images or patterns. The body/screen 734 may be a single material or color to project/provide a single color when lit 725 or be patterned or multicolored in some implementations of the flixel 700. While the screen/body 734 is shown shaped in a cylinder, many other shapes and configurations may be used such as a box/rectangular shaped body, a spherical-shaped body/ball, and so on.

During operations of an aerial display system such as system 600 of FIG. 6 with flixels such as flixel 700 of FIG. 7, the flixels may be controlled in a variety of ways to provide an aerial display. For example, an off board or ground station controller may be used to provide signals to control the lighting or other display output provided by each flixel's payload, and the flixels may fly in a flight pattern defined by a flight plan downloaded for local control or provided on an ongoing basis with control signals from the off board or ground station controller.

The flight plan may cause the flixels to move into a plurality of predefined positions and hover in or hold that position in an air space. The display payloads may then be operated to create a first static image. Then, the payloads may be second operated to create a second static image. The images may continue to be changed in this manner and the periodicity of the changes may provide multiple static images that remain separate or may become an animated display. In other embodiments, though, some or all of the flixels may be moved based on the flight plan to new positions prior to a second static or animated image being provided by a second operation state of all or a portion of the flixels' display payloads.

Further, another operating mode may be considered a dynamic mode or marquee application in which each flixel detects its present location and acts to update its payload operations to suit the new location. In other words, the local control logic (or GSC) may act to update the old image provided by the flixels to fit the new locations in the air space of the flixels, which may lead to an animated aerial display. In other cases, though, the movement of the flixels may be used to create new imagery/images, and the flixels may change their output from their display payloads while moving and not just when they reach a new way point or assigned location in a flight plan.

Figure 8:
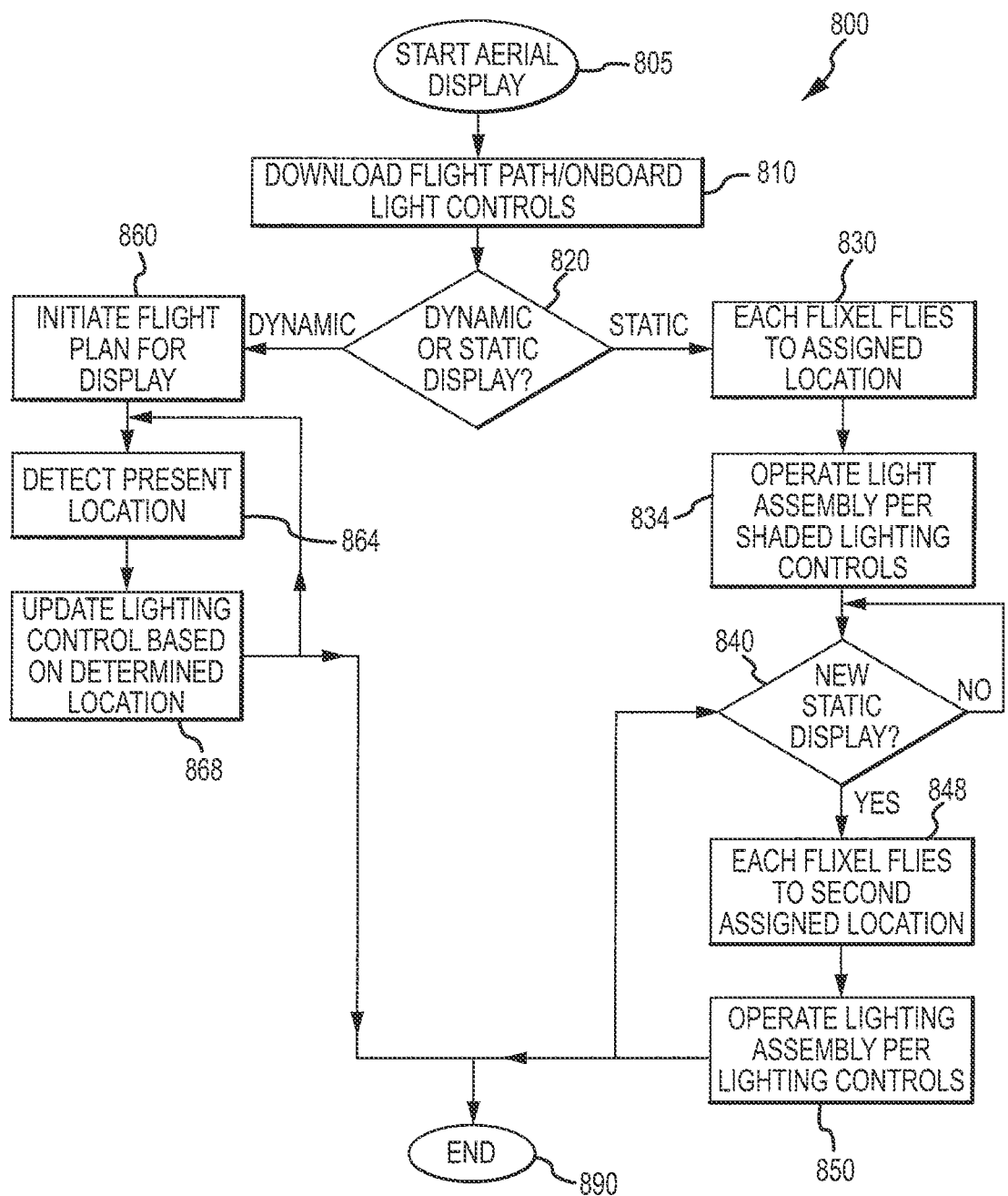
FIG. 8 is a flow chart showing steps for a method of controlling flixels or flying pixel assemblies to provide an aerial display.

FIG. 8 illustrates operation of an aerial display assembly with a control method 800 that implements a number of these show features. As shown in FIG. 8, the method 800 starts at 805 such as with selecting an air space for an aerial display and designing an aerial display(s) for that air space and for a particular flixel design (e.g., flying lanterns as shown at 700 in FIG. 7 or another configuration) and number of flixels (e.g., different displays possible depending on the number of flixels being used for a particular air space).

At 810, the method 800 continues with downloading flight path or plan data to each flixel (or its multicopter and its local control module). Further, at 810, onboard lighting controls or instructions may be downloaded (if used and not controlled solely by the GSC) for use by a lighting assembly controller and/or local control module of the multicopter or other propulsion mechanism. At 820, the method 800 continues with determining with the local or GSC controller whether the show/display is to be a dynamic or static display.

If static, the method 800 continues at 830 with each flixel being operated to fly to a next assigned location as defined by the downloaded flight plan (or based on commands from a GSC). At 834, the method 800 includes operating the lighting assembly when or prior to reaching the next way point of a flight path per the lighting controls. For example, a first set of the flixels may be controlled to illuminate the diffuser with red light while a second set of the flixels may be controlled to illuminate the diffuser of their payload with green light (and so on) at the first way points of the flight path. At 840, the controller (local or GSC) acts to determine whether a new static display is called for in the display definition. If no, the method 800 continues with holding the present location and lighting controls.

If yes at 840, the method 800 continues with each flixel (or a subset thereof) moving to a second assigned location or way point in the flight path. Then, at 850 (or on the way to the next way point), the method 800 continues with the lighting assembling being operated for each of the flixels to present the second or next static image. The method 800 may then continue at 840 or end at 890.

If at 820 a dynamic display is determined, the method 800 continues at 860 with initiating a flight plan for the display for each of the plurality of flixels. At 864, the method 800 continues with each flixel determining its present location in the air space. Then, at 868, each (or a subset) of the flixels uses its local controller to process this new location along with the display definition/data to control the display payload or lighting assembly of such a payload based on the present location. In this manner, a dynamic image can be created and updated by the combined operation of the flixels. The method 800 may continue at 864 or end at 890.

In some preferred embodiments, each flixel is configured with logic (code or programming in computer readable medium) to be able to process live or real time collected data to maintain show/display quality. For example, the logic may allow each of a number of flixels to know to change color (or otherwise change operation of the payload) if the present location in the air space requires it (e.g., floated into an area of the display where all other flixels are showing green the flixel control logic would cause the controller to switch its lights off or to green (to match the neighboring flixels)). Further, the flixel may try to correct its position to move it to where it is supposed to be or its next way point in its flight plan.

For example, the flixel may be assigned two or more neighboring flixels that it is to monitor during all or a portion of a show/display. During the display/show, the flixel may ping or communicate with the nearby flixels to get their current positions in the air space. If not the expected neighboring flixels, the flixel may respond by changing color to match the present neighboring flixels or take other action such as shut off display payload and/or move until find assigned neighbors.

Figure 9:
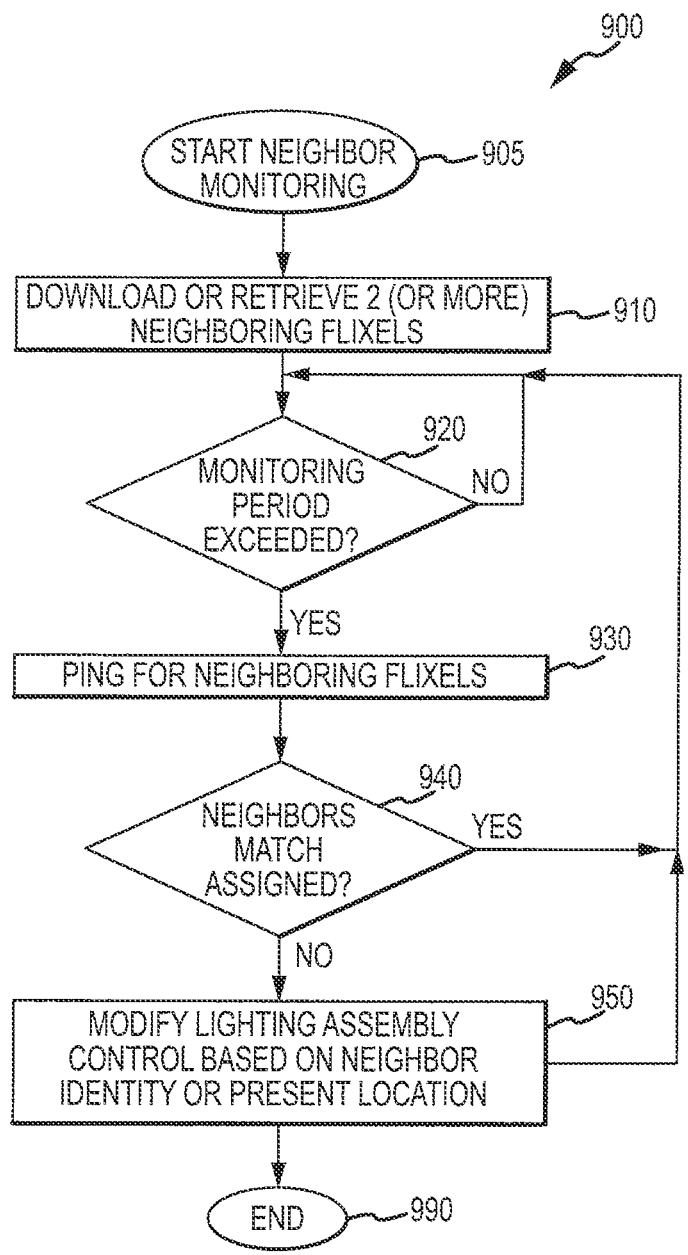
FIG. 9 is a flow chart showing steps for a method of controlling lighting assemblies within a plurality of flixels of an aerial display system based on neighboring flixels and/or present location of a flixel.

FIG. 9 illustrates implementation of such a monitoring method 900, which may be performed during or as part of the control method 800 of FIG. 8 (during a static or dynamic show/display). At 905, the method 900 starts such as with providing monitoring logic to each flixel and/or providing hardware/software for communicating with (pinging) neighboring flixels. At 910, the method 900 continues with downloading or storing two or more of the assigned neighboring flixels to each flixel. The neighboring or expected adjacent ones of the flixels may change over time as the show or display is performed (e.g., when at a first way point, a flixel may be near Flixel A and Flixel B while, when at a second way point, the same flixel may be near Flixel B and Flixel C).

The method 900 continues at 920 with the flixel determining whether a monitoring period has expired (e.g., ping every 2 to 4 seconds or the like). If not, the method 900 continues at 920. If a next monitoring period has arrived at 920, the method 900 continues at 930 with the flixel using its radio/communication devices to ping for neighboring flixels. At 940, the controller/logic determines whether the identified flixel neighbors match those assigned for this time/way point in the display/show. If a match is found, the method 900 continues at 920.

If a match is not found at 940, the method 900 continues at 950 with the controller/logic acting to modify the lighting assembly control (or display payload control) based on the identified neighbor(s) or its present location. This may involved a determination that flixels within a portion of the display air space are being used to provide a particular color or simply copying the display color of the present neighbors (e.g., the ping/communication may include receiving a message indicating the present color displayed by the neighboring flixels). The method 900 may then continue at 920 or end at 990.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system for providing an aerial display, comprising:
a plurality of UAVs each including a propulsion device and a display payload; and
a ground station system with a processor executing a fleet manager module and with memory storing a different flight plan and a set of display controls for each of the UAVs,
wherein, during a display time period, the UAVs concurrently execute the flight plans through operation of the propulsion devices and operate the display payloads based on the display controls.

2. The system of claim 1, wherein the display payloads each comprise a lighting assembly and a light controller and wherein the operating the display payloads includes using the light controller to selectively operate the lighting assembly to provide an output light.

3. The system of claim 2, wherein the output light is one of two or more colored light streams.

4. The system of claim 3, wherein each of the display payloads further comprises a light diffuser and the output light is directed onto a surface of the light diffuser.

5. The system of claim 4, wherein the light diffuser comprises a light diffusing screen extending about the lighting assembly and the surface is an inner surface of the light diffusing screen.

6. The system of claim 5, wherein each of the propulsion devices comprises a multicopter with a support structure upon which the display payload is mounted a distance apart from rotors of the multicopter.

7. The system of claim 3, wherein each of the propulsion devices includes a local control module and a communication mechanism for communicating with a neighboring one of the UAVs and wherein the light controller is operable based on a comparison of an identification of the neighboring one with a predefined neighbor in the flight plan.

8. The system of claim 1, wherein the flight plans are downloaded pre-flight to each of the propulsion devices, wherein during performance of an aerial display the propulsion devices independently and concurrently execute the downloaded flight plans, and wherein the display payloads of at least a subset of the UAVs are operated in two or more states based on progress of the UAVs along the downloaded flight plans.

9. The system of claim 1, wherein the flight plans are downloaded pre-flight to each of the propulsion devices, wherein during performance of an aerial display the propulsion devices independently and concurrently execute the downloaded flight plans, and wherein the fleet manager module communicates instructions to each of the UAVs to control operation of the display payloads during the performance of the aerial display.

10. A flight control method, comprising:
at a plurality of multicopters, receiving a flight plan unique to each of the multicopters;
concurrently operating the multicopters to execute the flight plans within an air space; and
during the operating of the multicopters, controlling a display payload supported by each of the multicopters to generate a visual display in the air space.

11. The method of claim 10, further including:

providing a communications channel between pairs of the multicopters;

with a first one of the multicopters detecting a second one of the multicopters in a predefined space proximal to the first one of the multicopters; and operating the display payload of the first one of the multicopters in a new manner based on an identity of the second one of the multicopters.

12. The method of claim 10, wherein the display payload comprises a light source and a light diffuser positioned to receive output light from the light source and wherein the controlling the display payload comprises operating the light source to output one of the two or more colors of light onto the light diffuser.

13. The method of claim 12, wherein the light diffuser comprises a cylindrical light screen and wherein the light source is positioned within a hollow space defined by the cylindrical light screen.

14. The method of claim 10, further comprising controlling of the display payload with a ground control system communicating signals to a controller within the display payload, whereby the display payload of at least a number of the multicopters is varied a predefined flight plan for the number of the multicopters.

15. An apparatus for use in an aerial display, comprising:

a multicopter;

a lighting assembly supported by the multicopter; and a light diffuser supported by the multicopter and positioned with a surface receiving output light from the lighting assembly, wherein the lighting assembly includes a light controller and a light source operable to provide color the output light at least two different colors, wherein the light controller operates to change the color during operation of the apparatus to provide the aerial display, wherein the multicopter includes a communication mechanism for communicating with another of the multicopters and including logic determining an identity of the other multicopter, and wherein the light controller operates to select the color based on the identity of the other multicopter.

16. The apparatus of claim 15, wherein the multicopter includes a local controller operating to move the multicopter along a flight plan associated with the aerial display and wherein the light assembly operates in at least a first and a second state at differing way points of the flight plan.

17. The apparatus of claim 15, wherein the first and second operating states are chosen from a plurality of states based on a present location of the multicopter, whereby the aerial display is animated.

* * * * *